May 21, 1963          R. H. GORHAM          3,090,188
CROP GATHERING AND CHOPPING DEVICE
Filed Dec. 12, 1958          3 Sheets-Sheet 1
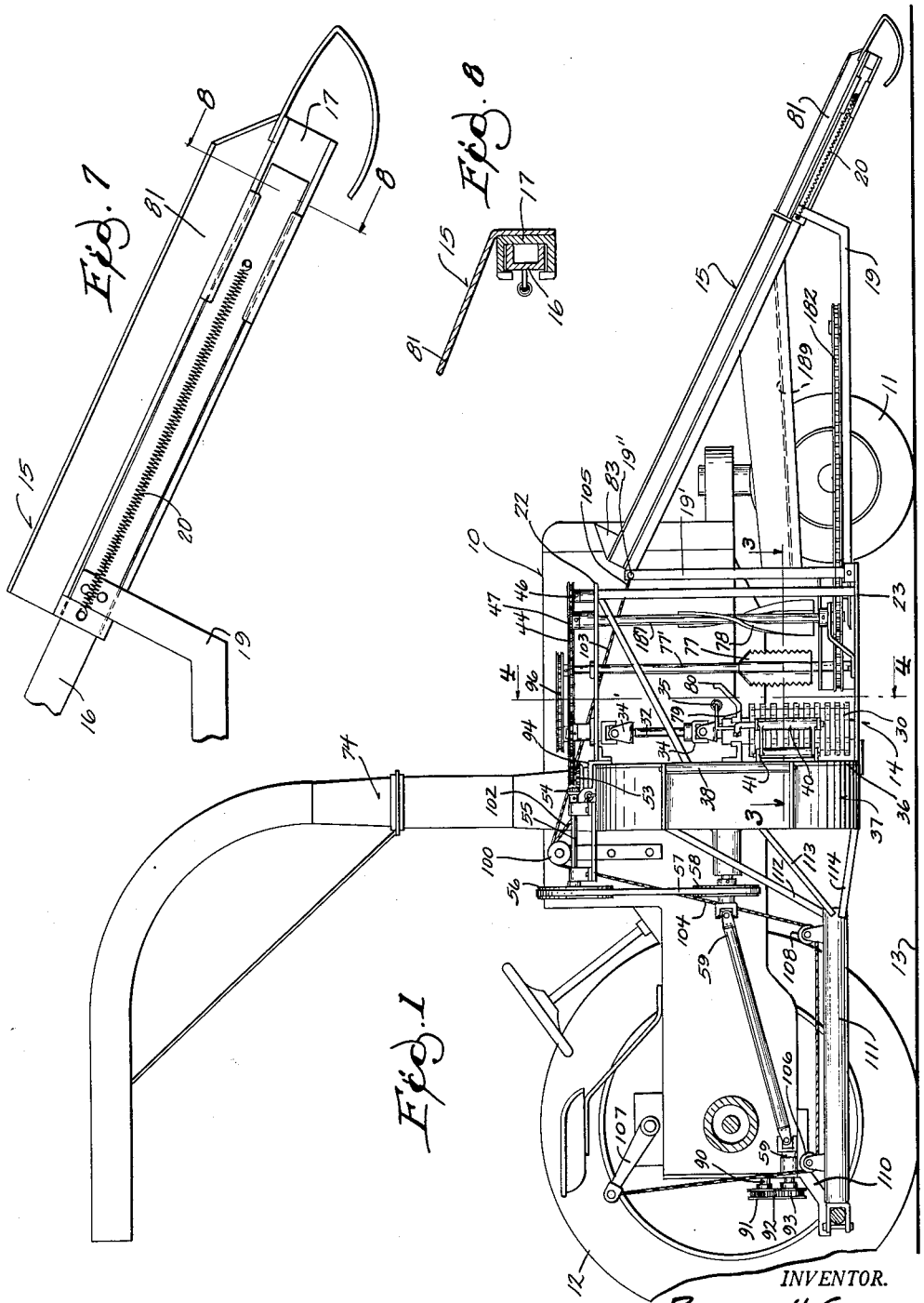
INVENTOR.
ROBERT H. GORHAM
BY
Wheeler, Wheeler & Wheeler
ATTORNEYS May 21, 1963  R. H. GORHAM  3,090,188
CROP GATHERING AND CHOPPING DEVICE
Filed Dec. 12, 1958  3 Sheets-Sheet 2
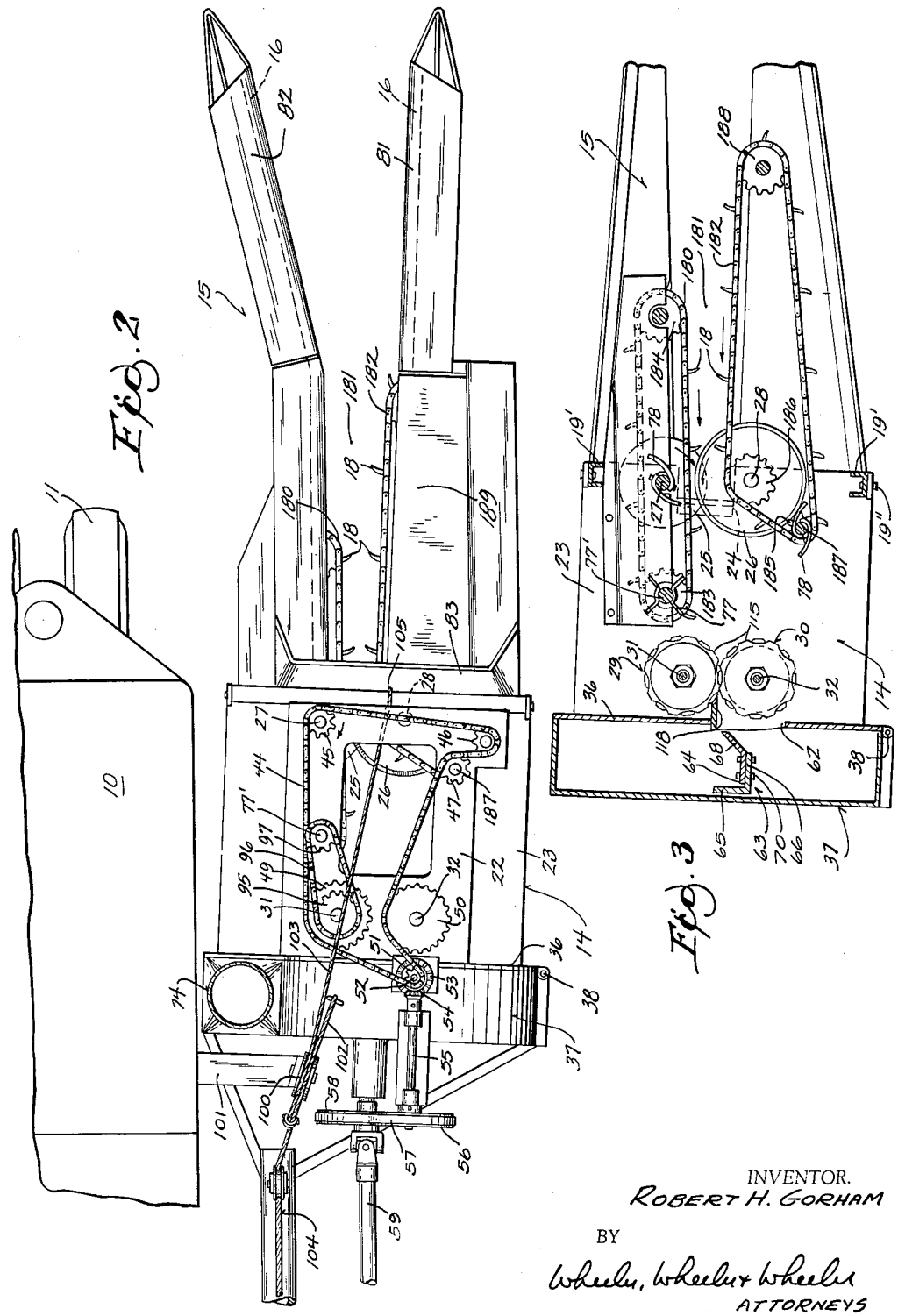
INVENTOR.
ROBERT H. GORHAM
BY
Wheeler, Wheeler & Wheeler
ATTORNEYS

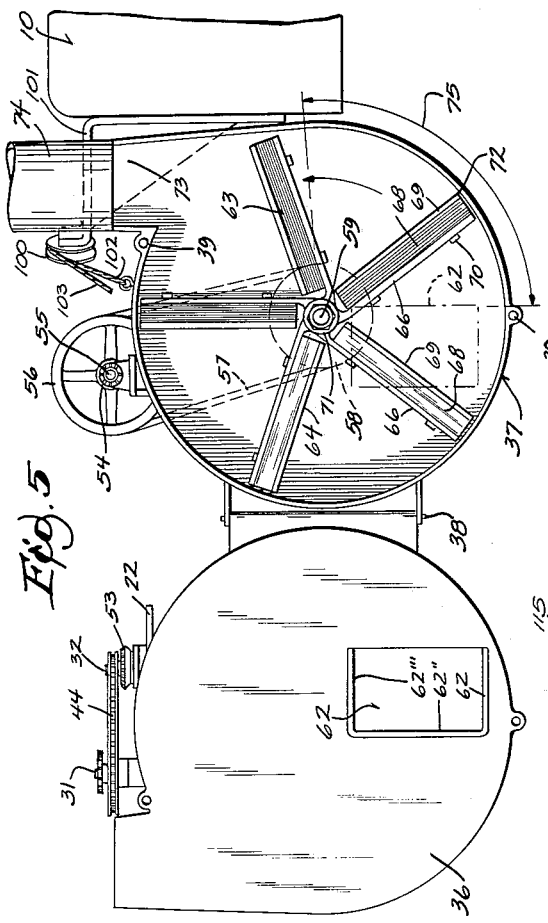

United States Patent Office 3,090,188
Patented May 21, 1963

3,090,188
CROP GATHERING AND CHOPPING DEVICE
Robert H. Gorham, Kendall, Wis., assignor of one-fourth to Adolph Wopat and one-fourth to Arthur Verwiebe, both of Kendall, Wis.
Filed Dec. 12, 1958, Ser. No. 780,121
11 Claims. (Cl. 56—503)

This invention relates, generally, to harvesters, and it has particular relation to harvesters for stalk crops such as corn, grain, hay and the like.

This application is a continuation in part of my application Serial Number 522,770, filed July 18, 1955, now abandoned.

Among the objects of this invention are the following:

To provide a harvester for direct association with a modern tractor in unitary assembly therewith whereby to derive power take-off advantages for the operating parts of the harvester and yet have ready access for servicing and repair of the driven parts; to provide a combination of chopper-centrifugal delivery parts in such relation to the tractor power take-off connections as to provide most efficient operation, and to so dispose the harvesting and stalk feeder elements as to supply the harvested crop to the chopper in the most efficient manner and without wind-up of long leaves or stalks about the operating elements; to provide a crop chopper having a high degree of efficiency in association with a novel centrifugal chopped crop delivery mechanism requiring much less power to accomplish both the chopping and delivery functions; to provide a harvester that is light in weight, relatively inexpensive, is efficient in operation and which can be readily detachably mounted on a tractor or the like and driven from its power take-off; to begin the cutting or chopping operation on the stalks immediately after they are cut from the ground; to mount the cutting means immediately to the rear of and at the level of the power operated cutting means; to feed the cut butt ends of the stalks to the chopper means through an intake opening at the bottom of the case that contains the chopper means; to position the discharge opening from the case so that there is a minimum of contact by the chopped stalks with the inner surface of the case; to incorporate the chopper means in a rotor in the case and to provide removable blade members thereof.

For a more complete understanding of the nature and scope of this invention, reference can be had to the following detailed description, taken together with the accompanying drawings, in which:

FIGURE 1 is a view, partly in section and partly in side elevation, illustrating how the harvester of the present invention can be mounted along side of a conventional tractor;

FIGURE 2 is an enlarged plan view of the harvester and including an outline of a portion of its associated tractor;

FIGURE 3 is an enlarged view showing a section on line 3—3 of FIGURE 1;

FIGURE 4 is a section on line 4—4 of FIGURE 1;

FIGURE 5 is a view in elevation of the chopping and chopped crop delivery apparatus of this invention, the cover of the casing being hingedly opened and an outline of a portion of the adjacent tractor body being shown to indicate the relation of the harvester thereto.

FIGURE 6 is a section on line 6—6 of FIGURE 4;

FIGURE 7 is an enlarged detail of the gathering means extended forwardly of the harvester.

FIGURE 8 is a section on line 8—8 of FIGURE 7.

FIGURE 9 is an enlarged plan view of feed rollers at the opening in the chopper housing portions of which housing are shown in horizontal section.

FIGURE 10 is an elevational view partly in section showing the rollers of FIGURE 9 part of one of the rollers being broken away in vertical section to show the built up construction with alternate discs.

As the description of this harvester and the associated tractor apparatus progresses, it will be noted that the harvester is small enough and so arranged as to its larger structural parts that it nestles into a space at the side of a tractor, ahead of a rear wheel, and close to the motor of the tractor as permitted in modern designs of tractors which have their front wheels closely set adjacent the longitudinal center line of the tractor. Also it will be noted that the gathering means are not placed accurately in parallelism with such center line, but are deliberately offset to tend to throw the crop stalks to one side, and, in the case of corn, throw the ears and heavy stalks onto a shelf which has a special function as will be described below.

Referring now particularly to FIGURE 1 of the drawings, it will be observed that the reference character 10 designates, generally, a tractor of well known type. The particular tractor 10 shown has been employed for illustrative purposes only, it being understood that other similar types of tractors can be employed. The tractor 10 includes front wheels 11 and rear wheels 12, only one of the latter being shown. The wheels 11 and 12 run along ground level as indicated at 13 which, it will be understood, is the level of the ground of the crop such as corn, grain, hay or other forage crop that is to be harvested. Detachably mounted along one side (the right hand side) of the tractor 10 is a harvester, shown generally at 14, in which the present invention is embodied. The harvester 14 is relatively light in weight, is compact and can be mounted, as shown, along one side of the tractor 10 in a position where there is ready access to the power take-off of the tractor.

The harvester 14 includes gathering means, indicated generally at 15, which can be used in connection with harvesting a row crop such as corn. The gathering means 15 includes bars 16, FIGURE 7, the outer ends of which diverge and which carry sleeve members 17 that are telescoped over the outer ends. Suitable springs 20 are provided for holding the sleeve members 17 in extended relation with respect to the diverging outer ends of the bars 16. The purpose of this arrangement is to permit the sleeve members 17 to move rearwardly over the diverging ends of the bars 16 in the event that an obstacle is encountered. It will be understood that the diverging ends of the bars 16 with the sleeve members 17 telescoped thereon are moved along opposite sides of the row of corn stalks or the like. As the divergent bars gather in the stalks of the crop to be harvested, the stalks are engaged by fingers 18 carried by chains described below, and the crop material is passed rearwardly toward the chopper and delivery apparatus. It will be understood that the crop gathering means thus far described are supported in part by braces 19 extending forwardly and upwardly from the main frame members described below.

The harvester 14 includes a top frame member 22 toward which the rear ends of the bars 16 are extended for attachment to support element 19', as shown. Underneath and parallel to the top frame member 22 is a floor guide plate 23 to which the rear ends of the braces 19 are secured. Suitable bolts 19" are employed for securing the gathering means 15 to the top frame support element 19' and to the floor guide plate 23. They facilitate the ready removal of the gathering means 15.

As shown more clearly in FIGURE 3 a notch 24 is provided in the forward edge of the floor guide plate 23 for receiving therein the lowermost portions of the stalks which are to be cut by power operated means immediately located thereat in the form of discs 25 and 26. The discs 25 and 26 are positioned in overlapping relation, have sharp cutting edges about their peripheries and are arranged to be driven in the directions indicated by the arrows. Shafts 27 and 28 are employed for carrying the discs 25 and 26 at their lower ends just above the surface of the floor guide plate 23. The lower ends of the shafts 27 and 28 are journaled in the floor guide plate 23.

As previously mentioned, the teeth 18 form parts of chain means between which the lower ends of crop stalks are directed by the forwardly positioned gathering means. These are throat chain means and comprise a pair of endless chains, one at 180 on the left of throat 181 through which the stalks pass and the other at 182 on the right of the throat. The throat chains extend approximately horizontally at a level slightly above floor guide plate 23 and are mounted upon sprockets as follows:

The left chain 180 extends over power sprocket 183 (see FIGS. 1 and 3), and over idler sprocket 184. The right chain 182 extends over power sprocket 185, over sprocket 186 on a shaft 28 and over idler sprocket 188 so that the chain is disposed just below a shelf 189, the purpose of which will be hereinafter described.

After the stalks have been cut by the power operated means comprising the discs 25 and 26 their butt end slide over the upper surface of the floor guide plate 23 and are picked up by feed rollers 29 and 30 that are carried at the lower ends of shafts 31 and 32. As shown in FIGURE 4 the shaft 31 is rotatably mounted in a sleeve bearing 33 while the feed roller 30 is movably mounted with respect to the feed roller 29 and a universal joint 34 serves to interconnect it with its shaft 32. A coil tension spring 35, FIGURES 4 and 6, acts to bias the feed roller 30 toward the feed roller 29 and to maintain it in engagement with the stalks being fed therebetween.

The sleeve bearing 33 is mounted on a front cover 36 of a chopper and rotor casing that is indicated, generally, at 37. The front cover 36 is hinged at 38 to the remaining portion of the casing 37 and is secured thereto by bolts 39. An arm 40 movably supports the lower end of the shaft 32 and the feed roller 30 and is hinged at 41 to the front cover 36. By mounting the feed rollers 29 and 30 on the cover 36 and hinging it with respect to the remainder of the casing 37 provides a simple and efficient way in which these parts can be mounted and yet they can be swung out of the way to permit access to the interior of the casing 37.

Since the floor guide plate 23 and the top frame member 22 are connected to the cover 26 they are mounted, with the gathering means, to swing as a unit with the cover laterally away from the tractor for servicing of all of this apparatus as well as to expose the chopping and delivery apparatus.

Any suitable means can be employed for driving the shafts 27 and 28 to rotate the discs 25 and 26 of the power operated means and also for rotating the shafts 31 and 32 to drive the feed rollers 29 and 30. For illustrative purposes a chain 44 is shown as being employed for this purpose. It extends over sprocket 45 that is fast on the upper ends of shaft 27 in such manner as to rotate this shaft as indicated by the arrow, FIGURE 2. The chain 44 extends over sprocket 46 which is an idler sprocket and then over sprocket 47 which is on shaft 187. The chain 44 also extends over sprockets 49 and 50 that are fast on the upper ends of the shafts 31 and 32 in such manner as to rotate them in opposite directions. Underneath the sprocket 50 is another universal joint 34' which cooperates with the universal joint 34 in maintaining driving relation with the feed roller 30 as it moves toward and away from the other feed roller 29. The chain 44 is driven from a sprocket 51 that is fast on the upper end of a shaft 52 which also carries a bevel gear 53 that is positioned in driving engagement with a second bevel gear 54 on a rearwardly horizontally extending shaft 55. Any suitable means can be employed for driving the shaft 55. As shown, a pulley 56 is fast on its rear end and is arranged to be driven by a belt 57 from a pulley 58 that is fast on a shaft 59 which, as indicated in FIGURE 1 is connected to be driven from the power take-off of the tractor 10.

Immediately to the rear of the feed rollers 29 and 30 is an intake opening 62 which is generally rectangular in shape and is located in the front cover 36 of the chopper and rotor casing 37. The opening 62 is shown in full lines in the cover 36 opened as in FIGURE 5 and the outline of the opening 62 is shown in dotted lines at the right in FIGURE 5 to show the position of opening 62 relative to the moving parts inside the casing when the cover is closed. It will be understood that the stalks are fed butt end first by the feed rollers 29 and 30 through the opening 62 into the casing 37. Here these butt ends and the balance of the stalks are chopped by means of a combined cutter and rotor that is indicated, generally, at 63.

The term rotor is here deliberately used to distinguish from the common "blower." The rotor as shown in the drawings is a cutting and centrifugal throwing mechanism and attention is called to the marked difference between the casing 37 and the small opening 62 as contrasted with the usual blower housing which has ample air inlet in addition to such openings as may be provided for entry of crop stalks, etc. In the instant mechanism, not only is the opening 62 very small (only large enough for entry of the crop), but even this relatively small opening is blocked by rollers 29 and 30 which are only separated from each other as necessary to pass the crop load. To demonstrate the absence of blowing function in the instant mechanism, it has been repeatedly noted that fragments of cut corn stalk dropped down the outlet pipe 74 while the rotor was operating at high speeds have actually dropped freely until the pieces contacted one of the rotor blades. During usual high speed operation at 1000 r.p.m. there is insufficient air movement in the outlet pipe 74 to sustain the weight of freely dropped crop material.

The combined cutter and rotor is mounted on the shaft 59 which is driven directly from the power take-off of the tractor 10. It includes blades 64 which may be of any desired number. Five blades 64 are shown. Preferably the blades 64 are of channel shape, as shown in FIGURES 3 and 6. Each includes a side 65 which extends radially from the shaft 59 and a bottom 66 which extends at right angles to the side 65. Adjacent the inner surface of the cover 36 each blade 64 has a removable blade member 68. Each blade member has a cutting edge 69 and bolts 70, extending through bottom 66 serve to detachably mount the blade member 68 thereto. It will be observed that the blades 64 extend from a central hub 71 which is carried by the shaft 59 and secured thereto for rotation. The shaft 59 and the combined chopper and rotor 63 rotate in a counterclockwise direction as indicated by the arrow in FIGURE 5. The tip 72 of the blade 64 in the lowermost position is spaced only slightly above the upper surface of the floor guide plate 23. It is about at the level of the power operated cutting means comprising the discs 25 and 26 at the forward end of the floor guide plate 23. Not only do the rotor arms 64 cut the stalks as they are fed through the intake opening 62 but also they act as centrifugal throwers to discharge the cut stalks upwardly through a discharge outlet 73 into a discharge pipe 74 which leads upwardly, as shown in FIGURE 1, over the tractor 10 to a suitable receptacle (not shown). The relationship between the intake opening 62 and the discharge opening 73 is such that only a small arc of contact, as indicated at 75 in FIGURE 5, is involved in the centrifugal delivery discharge of the cut stalks from the intake opening 62 to the discharge opening 73. Because of this relatively small arc of contact with the interior of the casing 37, there is a minimum of friction drag on the cut stalks as they are carried from the intake opening 62 to the discharge opening 73.

It will be noted that the margins 62', 62" and 62''' are heavily reinforced to provide the cutting margins to interact with the edges 69 of the blades 68. Therefore the cut or chopped crop particles are "picked up" and carried in the channel formed by the side 65, the bottom 66 and the blade 68 and since the shaft 59 is rotated at a high rate of speed, the centrifugal delivery discharge and the efficiency of the mechanical throwing action is remarkable. After long continued operation in a corn harvesting operation, it has been found that only the arc of the casing 37 between the opening 62 and the outlet 73 is burnished and the remainder is lightly coated with juices and slight accumulations indicating that the centrifugal action or drag of chopped crop is at a minimum. Furthermore, the power requirement for cutting and delivery is reduced as compared with other cutters and choppers using enlarged central air intakes using pneumatic rather than mechanical throwing operation.

It will further be noted that the removable blades 68 are at a 45 degree angle with reference to the bottom 64 of the blade arms. This angle is quite critical to accomplish not only the cutting operation which severs the particles from the advancing stalks going through the opening 62 but also a crushing operation which breaks the outer dry shell of the stalks so that a better compacting of the crop in mow or silo is possible. Any substantial deviation from the 45 degree angle referred to and from the general relation shown will not break the shells of the stalks, and the storage bulk of the crop will then be markedly greater. A theory as to why the 45 degree angle of the blade accomplishes both the crushing and the cutting operation has not been developed, but both experimental and practical operation of the disclosed apparatus has demonstrated the described beneficial action.

With a view to feeding the cut stalks toward the feed rollers 29 and 30, flexible paddle members 78 are secured to the shafts 27 and 187 (see FIGS. 1 and 3) and rigid paddles 77 are secured to shaft 77'. These paddle members 77 and 78 cooperate to push the cut stalks between the feed rollers 29 and 30. Top guide plate 79 above the feed rollers 29 and 30 having an upwardly curved forward edge 80 acts to guide the butt ends of the stalks to the feed rollers 29 and 30.

Reference has been made to the relationship of the center line of the tractor and its straight forward line of travel as compared with the somewhat angular deviation therefrom of the longitudinal center line of this harvester, and particularly the center line of the gathering means 15. This is clearly shown in FIGURES 2 and 3. Particularly noteworthy is the angular forward projection of bar 16 and it sleeve 81 at the right hand of the gathering means. The left hand gathering assembly at 82 is flared to the left for a funnelling function and tends to obscure the angle at which the harvester is disposed, but it will be observed that the stalks entering between 81 and 82 will be urged against the margin of shelf 189, and more heavily against chain 180 than against chain 182. Then as the fingers 18 tend to feed the stalks rearwardly in readiness for the cutting operation at 25—26, there is a funnelling of the leafy and upper stalk portions of the crop against a "laying down" guard 83 of sheet metal. By the time the lower portions of the stalks are fed back toward the rolls 29 and 30 a "whipping" movement of the upper parts of the stalks and leafy parts results when they contact the portion of guard 83 along the forward margin of frame 22. During this whipping movement the angle of fall of the stalks is directed downwardly to the right upon shelf 189 where the horizontal direction of the crop is assured and a positive direction is given toward opening 62 in the chopper housing cover 36. It is particularly to be noted that the heavy portions of the crop such as the ears of corn are brought down on shelf 189 and are not whipped off of the stalks.

To clarify the description of the means for driving the various powered operating elements of this harvester, attention is directed to the power take-off shaft 90 provided with a sprocket 91 for chain 92 connected to sprocket 93 on shaft 59. This shaft is equipped with universal joints as shown in FIGURE 1 to drive directly the hub 71 and its associated bladed arms 64. Then, by means of pulley 58 on shaft 59 and belt 57 to pulley 56 on shaft 55 the bevel pinion 54 is rotated. Bevel gear 53, however, is mounted to rotate on a stub shaft forming part of an angle bracket 94 secured to cover 36, and the two bevel, toothed elements 54 and 53 are only in mesh when the cover is closed and bolted tightly in closed position by means of bolts 39.

When the bevel elements are in mesh, the power connections are complete to operate chain 44 for constant rotation of rolls 29 and 30, paddle members 77 and 78, and power operated cutter discs 25 and 26 as shown in FIGURES 1 and 2, power connection to shaft 77' being completed through sprocket 95 on shaft 31, chain 96, and sprocket 97 on shaft 77'.

The weight support and forward thrust required by the entire harvester are furnished by the following equipment. A pulley at 100 is carried by a heavy bracket 101 secured to the tractor. Over the pulley extend two branches 102 and 103 of a supporting cable 104, one of the branches 103 extending to the forward margin of support member 19' at 105, where it supports the gathering means 15 and other apparatus assembled forwardly on the cover 36. The other branch 102 of the cable is attached to a ring in the casing 37. Cable 104 extends over pulleys at 108 and 106 and has its rear anchorage to lever 107 adjacent the driver's seat of the tractor as shown in FIGURE 1. The lever is adjustable under driver control in the event that the cover 36 is to be opened. Forward thrust to the harvester is provided by a thrust backet 110 at the rear of the tractor. To this is attached a thrust tube 111 connected to braces 112, 113 and 114 attached to casing 37 as shown clearly in FIGURES 1 and 2.

Assuming, then, that this harvester has been used to cut a crop which has been gathered by the forward gathering means 15, fed back in a whipping action to the right, partly onto the shelf 189, as the chains 180 and 182 feed the stalks to the power cutting means 25—26. The butt first feed is completed by the paddles 77 and 78 and then the rolls 29 and 30 so that the crop is forced through opening 62, against the margins of which the crop is cut by blades 68. The severed pieces of chopped crop then are thrown through 73 to the delivery discharge pipe 74 with merely a third of a circle travel in the casing 37. Sooner or later the blades 68 or other equipment will require attention, such as sharpening or repair, and then the bolts 39 may be removed so as to loosen the cover 36. This will make it possible, when cable 104 is relieved of tension, to swing the gathering means 15 outwardly, laterally to the right upon the hinge at 38. This not only opens the casing 37, but also places all the chains, paddles, rolls and other equipment in exposed position.

Previously the rolls 29 and 30 have been merely generally referred to as rolls, but it will be seen in FIGURES 9 and 10 that each of these is built up of alternate scallop margined discs 115 which are one-half inch thick, and smaller diameter spacers 116 which are three-eighth of an inch thick. The entire assembly of each roll is held together by a tubular central core 117 whereby to be mounted on its respective shaft for rotation. To strip any wound up crop material, the reinforced margin of opening 62 at 62" is shaped with an edge complementary to its adjacent roll 129 with outstanding stripper surfaces 118 to "ride" closely adjacent the circular surfaces of spacers 116. It will be noted that the outstanding portions of the scalloped margins of the one disc 115 are offset circumferentially from the outstanding portions of its closest neighbors.

I claim:
1. In a device movable in a given direction along a row for harvesting crops such as corn, in combination, a drum shaped casing provided with front and rear faces and having a generally circular front face adapted to be positioned transversely of said direction of movement and to be moved therealong, said front face being provided with an intake opening located at a six o'clock position wholly in the lower portion thereof, said casing having a peripheral discharge opening above and to one side of said intake opening and between said front and rear faces, and rapidly revolving means mounted on an axis parallel with said direction within said casing for cutting the stalks as they are fed into said casing through said intake opening and shaped to move the cut stalks centrifugally through an arc in said casing to said discharge opening.

2. The device of claim 1 in which said discharge opening is substantially one third of a complete circle along said arc from said opening.

3. The device of claim 1 in which the rapidly revolving means for cutting the stalks comprises a substantially radial arm in said casing provided with a bottom, a side wall, and a blade to provide a side wall to complete a channel shaped throwing arm positioned to receive cut crop and centrifugally move it to said discharge opening.

4. The device of claim 1 in which the rapidly revolving means for cutting the stalks comprises a radial bladed arm, and the opening in the casing is provided with a complementary cutting margin past which said bladed arm is revolved, the angle of the blade respecting the radial arm being substantially 45 degrees from the axis of rotation of the arm whereby to cut and split the shells of the stalks.

5. A harvester mounted for forward crop harvesting movement and having a drum shaped casing including crop chopping equipment therein, said casing having a circuit forward cover face hingedly connected to said casing, and gathering and feeding means mounted to said cover face for swinging movement therewith.

6. A tractor mountable crop harvester for a tractor having a prime mover, said harvester having a drum shaped casing with a substantially circular cover forming a forward face of the casing, crop gathering and feeding means mounted to said cover, said cover having hinge connection to the drum at the nine o'clock position and an opening for feed of crop into the casing at six o'clock position when viewed from the front of the tractor, means for supporting and power operating said harvester beside a tractor, said operating means including separable connections at twelve o'clock position to operate the crop gathering means mounted to said cover.

7. A crop chopping and chopped crop delivery apparatus including a drum shaped casing having a restricted entry opening for crop material and having a rotor therein provided with power driving means for rapid rotation, said rotor having a bladed arm mounted to swing in chopping relation to a portion of said casing about said entry opening, the casing having a delivery opening tangential to said rotor.

8. The apparatus of claim 7 wherein the rotor arm is channel shaped with an open peripheral end to throw chopped crop material radially outwardly therefrom.

9. The apparatus of claim 7 wherein the entry opening and the delivery opening are approximately one-third of the circle of rotor rotation from each other whereby crop material chopped at said portion of the casing is centrifugally thrown through said delivery opening after one-third of a circle travel in said casing.

10. In a crop chopping and delivery apparatus a drum shaped casing having a forward circular face provided with a circumferentially small crop infeeding opening adjacent the periphery of the face and having a pair of revoluble infeeding rolls positioned immediately exteriorly of the casing to substantially block air entry through said infeed opening, one of said rolls being provided with biasing means permitting separation of the rolls for crop infeeding operation, a power operated bladed rotor in the casing for chopping crop material entering the casing through said opening, and a tangential delivery opening in the casing for centrifugal delivery of chopped crop material.

11. In a crop harvest chopper, a generally drum shaped casing of air impervious material provided with spaced front and rear faces, the front face being generally circular and having an opening for feed of crop into the casing, said opening being wholly restricted to an area within a radius of said circular face not extending across the center of the face and limited to a minimum area for admission of crop with a minimum of air, said casing having a peripheral discharge opening, a rotor extending substantially across said casing and having cutting and centrifugal guiding means mounted thereon to swing revolubly in said casing in a direction to move said cutting and guiding means past said opening for feed of crop and then past said peripheral discharge opening, the arc between said openings being less than 180°.

References Cited in the file of this patent

UNITED STATES PATENTS

| | | |
|---|---|---|
| 1,461,764 | Silver | July 17, 1923 |
| 2,253,794 | Lindholm | Aug. 26, 1941 |
| 2,442,520 | Van Sickle | June 1, 1948 |
| 2,657,513 | Martin | Nov. 3, 1953 |
| 2,713,240 | West | July 19, 1955 |
| 2,731,995 | Sutherland et al. | Jan. 24, 1956 |
| 2,835,097 | Sullivan | May 20, 1958 |
| 2,848,029 | West | Aug. 19, 1958 |
| 2,862,345 | Wigham | Dec. 2, 1958 |
| 2,873,779 | Eykamp | Feb. 17, 1959 |